US010699277B2

(12) United States Patent
Smets et al.

(10) Patent No.: US 10,699,277 B2
(45) Date of Patent: Jun. 30, 2020

(54) SECURITY FOR MOBILE PAYMENT APPLICATIONS

(71) Applicant: MasterCard International Incorporated, Purchase, NY (US)

(72) Inventors: Patrik Smets, Nijlen (BE); Axel Cateland, Scarsdale, NY (US); Ian David Alan Maddocks, Milton Keynes (GB); David Anthony Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 613 days.

(21) Appl. No.: 14/983,973

(22) Filed: Dec. 30, 2015

(65) Prior Publication Data

US 2016/0217467 A1  Jul. 28, 2016

(30) Foreign Application Priority Data

Dec. 30, 2014  (GB) .................................. 1423362.1

(51) Int. Cl.
*G06Q 20/40* (2012.01)
*G06Q 20/34* (2012.01)
*G06Q 20/32* (2012.01)

(52) U.S. Cl.
CPC ....... *G06Q 20/405* (2013.01); *G06Q 20/3226* (2013.01); *G06Q 20/3227* (2013.01); *G06Q 20/3574* (2013.01); *G06Q 20/35765* (2013.01)

(58) Field of Classification Search
CPC ............. G06Q 20/405; G06Q 20/3226; G06Q 20/3227; G06Q 20/3574; G06Q 20/35765
See application file for complete search history.

(56) References Cited

U.S. PATENT DOCUMENTS 8,694,795 B1   4/2014  Aissi
9,911,121 B2 *  3/2018  Wankmueller ......... G06Q 20/32
(Continued)

FOREIGN PATENT DOCUMENTS

WO  2014/027859 A1  2/2014

OTHER PUBLICATIONS

"Examination Report No. 1", IP Australia, dated Jun. 26, 2018, Australian Application No. 2015374037, 3 pp.
(Continued)

*Primary Examiner* — Steven S Kim
*Assistant Examiner* — Timothy Paul Sax
(74) *Attorney, Agent, or Firm* — Buckley, Maschoff & Talwalkar LLC

(57) ABSTRACT

A mobile computing device having at least one processor and at least one memory, together providing a first execution environment and a second execution environment logically isolated from the first execution environment, the mobile computing device comprising: a first application executable within the first execution environment; a second trusted application executable within the second execution environment; and a secure communications channel between the first application and the second trusted application, wherein the second trusted application is configured to generate one or more data items and to provide the one or more data items to the first application via the secure communications channel.

13 Claims, 11 Drawing Sheets

(56) References Cited

U.S. PATENT DOCUMENTS

| | | | | |
|---|---|---|---|---|
| 2008/0120236 A1* | 5/2008 | Faith | .................. | G06Q 20/20 |
| | | | | 705/44 |
| 2014/0172721 A1* | 6/2014 | Weiss | .................. | G06F 21/42 |
| | | | | 705/64 |
| 2016/0063490 A1* | 3/2016 | Ziat | .................. | G06Q 20/02 |
| | | | | 705/71 |
| 2016/0110528 A1* | 4/2016 | Gupta | .................. | G06F 21/31 |
| | | | | 726/19 |

OTHER PUBLICATIONS

"PCT Search Report and Written Opinion", International Searching Authority, dated Jun. 2, 2016, for International Application No. PCT/US2015/068024, 8pgs.

"Singapore Written Opinion", Intellectual Property Office of Singapore (IPOS), dated Dec. 2, 2018, Singapore Application No. 11201705430T, 5pgs.

"Canadian Office Action", Innovation, Science and Economic Development Canada, dated Apr. 19, 2018 (Apr. 19, 2018), Canadian Application No. 2,972,895, 3pgs.

"Communication pursuant to Article 94(3) EPC", dated Aug. 16, 2019 (Aug. 16, 2019), European Patent Office, for European Application No. 15825755.0-1217, 7pgs.

\* cited by examiner

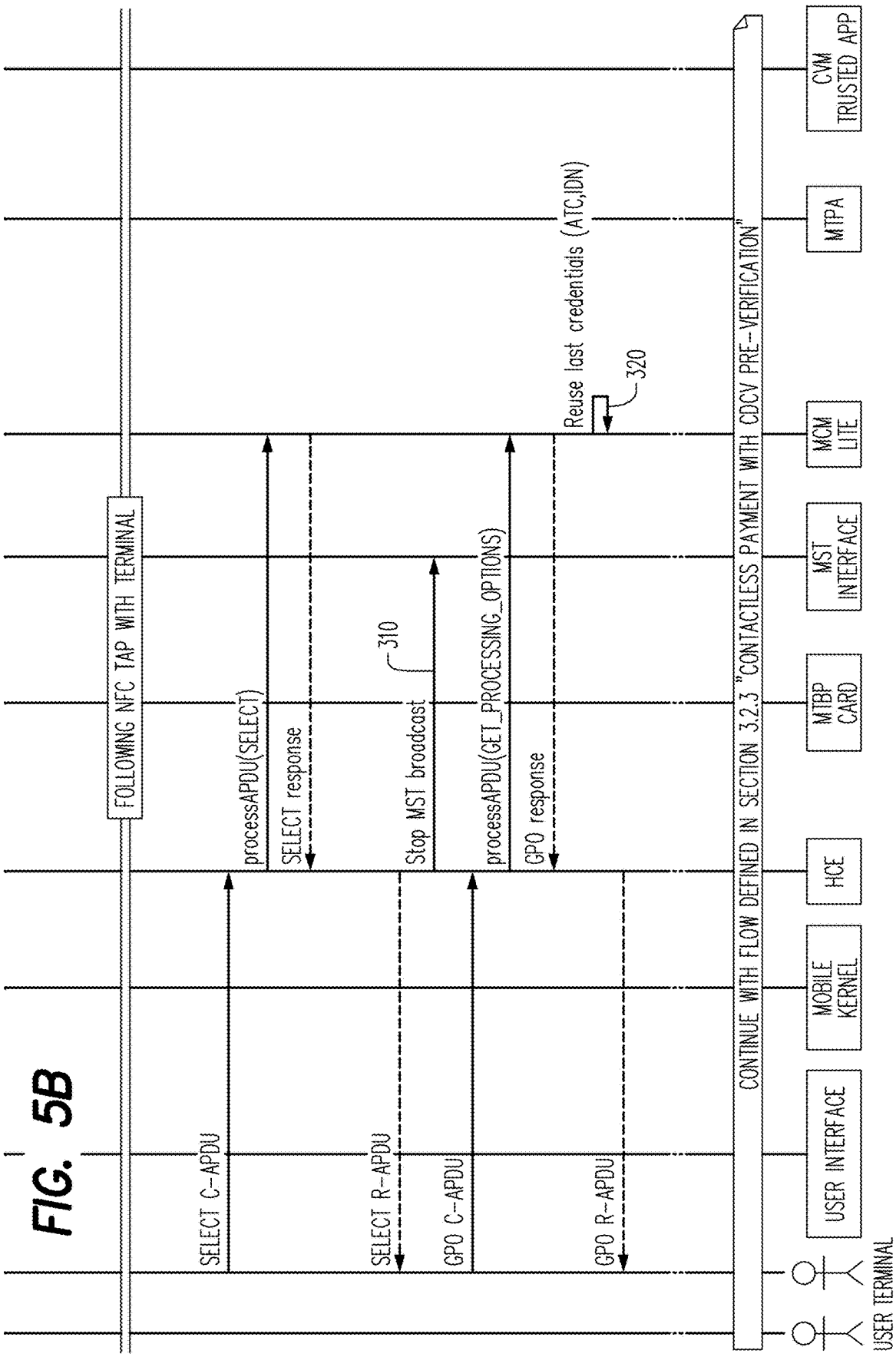

SECURITY FOR MOBILE PAYMENT APPLICATIONS

CROSS-REFERENCE TO RELATED APPLICATION

This application is a U.S. National Stage filing under 35 U.S.C. § 119, based on and claiming benefit of and priority to GB Patent Application No. 1423362.1 filed Dec. 30, 2014.

TECHNICAL FIELD

The present disclosure relates to a mobile computing device for executing an application, particularly but not exclusively to a mobile computing device for executing a mobile payment application. Aspects of the disclosure relate to a method for managing data items in the afore-mentioned mobile computing device.

BACKGROUND

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POI) terminal to perform a transaction. These transaction cards may interact with a POI by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

The present applicants have developed a proprietary system, known as MasterCard® Contactless, for performing contactless transactions. The present applicants have also appreciated that it would be possible to use a computing device such as a mobile telephone as a proxy for a payment card. They have also developed a mobile payment application, M/Chip Mobile, which can be downloaded to a mobile cellular telephone handset (hereafter "mobile phone") to act as a proxy for a payment card using Near Field Communication (NFC) technology standards, which are built in to the majority of current mobile phones. NFC is a development upon RFID, and NFC-enabled devices are able to operate in the same manner as RFID devices—though an NFC-device is active rather than passive, as it is powered by the mobile phone battery rather than relying on inductive pickup from a reader device. Using M/Chip Mobile, a user can conduct tapping based-transactions with a proximity reader, as well as perform account management operations over an appropriate network interface (cellular, local wireless network) in an online banking interface with the user's account provider.

Other mobile payment applications and associated services exist, typically having a similar functionality and potentially incorporating similar solutions. Examples are Apple Pay (operating on iOS devices) and Google Wallet (operating on Android devices).

Mobile payment applications require access to sensitive data for their operation. There are known mechanisms for holding secure data and performing secure operations on a mobile device. One approach is to use a secure element (SE) in the mobile device. A conventional SE is a tamper-resistant physical device, generally physically and logically protected to allow operations and data taking place in it to be trusted by other system elements. Another approach is to use a trusted execution environment (TEE)—this is an isolated execution environment provided by the main processor of the mobile device adapted so that code and data loaded within it is confidential and integrity protected. The TEE operates in parallel to the main operating system of the mobile device, and certain aspects of payment processing are carried out in the TEE for added security. For Android devices, a software architecture termed host card emulation (HCE) has been introduced (from Android 4.4 onwards) to provide representations of electronic identity using software alone without the use of a secure element—this has been used to achieve transactions using near field communication (NFC) protocols.

Often, those solutions that do not make use of a secure element within the mobile device require the periodic supply of session keys from a secure cloud-based server owned by the card issuer. This can be problematic when carrying out a large number of transactions, as there are a limited number of session keys available.

Against this background, the present disclosure aims to provide a method of carrying out payment transactions securely using a mobile phone (or other mobile device), without the need for either a chip-based SE or the periodic supply of session keys using a cloud-based solution.

SUMMARY

According to an aspect of the disclosure, there is provided a mobile computing device having at least one processor and at least one memory, together providing a first execution environment and a second execution environment logically isolated from the first execution environment. The mobile computing device comprises a first application executable within the first execution environment. The mobile computing device comprises a second trusted application executable within the second execution environment. The mobile computing device comprises a secure communications channel between the first application and the second trusted application. The second trusted application is configured to generate one or more data items and to provide the one or more data items to the first application via the secure communications channel.

An advantage associated with the above-described configuration is that it provides for a highly flexible, simple and secure means for carrying out secure processing by utilizing the capabilities of a trusted execution environment (TEE) and a Rich execution environment (REE) within a user's mobile device. It is not necessary in the above configuration for any external system elements to be utilized in the main processing steps. The above configuration also has an advantage in that it allows the most sensitive information to be retained securely within the TEE (and never released to the REE), whilst enabling the majority (if not all) of the processing to be carried out within the mobile device.

Optionally, the second trusted application is configured to receive configuration data from the first application via the secure communications channel, the configuration data comprising instructions for generating the one or more data items.

Advantageously, in the above-described configuration, the first application may comprise all of the software libraries and logic required to carry out the process, and is able to simply call the second application at the appropriate time to generate the data items securely. The present disclosure therefore effectively separates the processing steps between the REE and the TEE, and improves the flexibility and security of the system.

Optionally, a first one of the one or more data items comprises an authentication code for use in authenticating a process executed by the first application in the first execution environment.

Advantageously, the generation of an authentication code by the second application within the secure TEE, and its subsequent transmission to the first application to authenticate the process carried out by the first application (in the relatively less secure REE), increases the security of the system as sensitive data does not leave the TEE.

Optionally, the second trusted application is configured to generate the authentication code by combining a plurality of data elements, and the plurality of data elements to be combined is dependent on the type of process to be executed.

The second trusted application is able to tailor the properties of the authentication code generated to suit the needs of the particular process which is being carried out by the first application. This functionality of the present disclosure is advantageous as it provides for a highly flexible authentication system with all the benefits associated with using the secure environment of the TEE.

Optionally, at least one of the plurality of data elements is received by the second trusted application from the first application via the secure communications channel.

The second trusted application is able to receive additional data or information via a secure communications channel from the first application in order to generate an authentication code. This means that the second trusted application does not require all of the requisite information to be provided to it initially or subsequently by an additional external source, and is able to flexibly incorporate information obtained by the first application from the user whilst the process is being carried out. This increases the flexibility and security of the system, and may be especially useful when carrying out transaction processes where information provided by a user during the transaction is used as part of the input when generating the authentication code.

Optionally, at least one of the plurality of data elements is stored by the second trusted application within the second execution environment.

The present disclosure allows the second trusted application to pre-store data within the TEE that is required for the generation of an authentication code. This advantageously increases the security of the system as it ensures that certain sensitive data elements required for generation of the authentication code can be provided to the second trusted application to be retained securely within the TEE, and are not output directly to the relatively less-secure REE.

Optionally, the first application is a mobile payment application and is configured to execute a payment transaction. The payment transaction may correspond to any one of: a remote payment transaction, an NFC-enabled transaction, and a magnetic stripe transaction.

Advantageously, the present disclosure ensures that a high level of security is able to be maintained for the multiple different types of payment transactions which the mobile computing device is configured to carry out.

Optionally, the one or more data items comprise at least one of: a unique representation of the payment transaction, and an authentication code for use in authenticating the payment transaction.

Advantageously, the second trusted application may generate an ATC (Application Transaction Counter), or other type of unique representation of the transaction, within the secure TEE, thereby increasing the security of the payment process as sensitive data is processed and retained only within the TEE. In addition, generating a transaction authentication code (e.g. a cryptogram or Message Authentication Code MAC) within the secure TEE, which code is used to verify that a particular transaction has been successfully carried out and that cardholder verification has been performed successfully, ensures that the security of transaction is maintained and that external (or additional) verification of the transaction is not required.

The second trusted application may be configured to generate the authentication code by combining a plurality of data elements, where the plurality of data elements to be combined is dependent on the type of payment transaction to be executed.

Optionally, at least one of the plurality of data elements may be stored by the second trusted application within the second execution environment.

The second trusted application is able to generate different types of cryptograms, tailoring each cryptogram generated to the type required to authenticate a particular transaction type. For example, the cryptogram associated with an MST transaction is different from that associated with a remote or Internet transaction. This functionality of the present disclosure is advantageous as it provides for a highly flexible authentication system, largely contained within the secure environment of the TEE.

Optionally, the mobile computing device further comprises a biometric sensor for use in authenticating a user of the device.

Advantageously, this allows the device to securely verify the identity of a user using biometrics. Although the use of biometric verification does increase the security of the process, it should be noted that other methods of verifying a user's identity may also be applied in the present disclosure (e.g. user password entry).

Optionally, the mobile computing device further comprises a secure data connection to an external server of a provider of the first application.

Advantageously, this allows the mobile computing device (and therefore the first application) to communicate with an external server of the payment provider or card issuer, and thereby to receive data of information relating to the process executed by the first application. In the context of a payment transaction, this received data may be used in the generation of a MAC and the authentication of the transaction by the second trusted application.

According to another aspect of the disclosure, there is provided a method of managing data items in a mobile computing device, the mobile computing device having at least one processor and at least one memory together providing a first execution environment and a second execution environment logically isolated from the first execution environment. The method comprises establishing a secure communications channel between a first application in the first execution environment and a second trusted application in the second execution environment. The method comprises generating one or more data items by the second trusted application and providing the one or more data items to the first application via the secure communications channel. The method comprises executing the first application in the first execution environment.

Optionally, the method further comprises receiving at the second trusted application configuration data from the first application via the secure communications channel, the configuration data comprising instructions for generating the one or more data items.

Optionally, the method further comprises authenticating a process executed by the first application in the first execution environment, and wherein a first one of the one or more data items comprises an authentication code for use in authenticating the process.

Optionally, the method further comprises generating the authentication code by combining a plurality of data elements, where the plurality of data elements to be combined is dependent on the type of process to be executed.

It should be noted that advantages which have been described previously in relation to aspects of the disclosure, when expressed in terms of a system or device, apply equally as advantages of the disclosure when expressed in terms of a method.

Optionally, the method further comprises initializing the first application and second trusted application by receiving setup data transmitted from a remote trusted party to the first application and the second trusted application.

Advantageously, the present disclosure allows the functionality of the two applications to be set in an initialization or personalization step, where instructions for carrying out the process are provided to the applications, via a secure communications channel, from the application service provider prior to the process being executed. This increases the flexibility of the method when handling and executing different processes, as the applications are pre-programmed with all the data and instructions necessary to carry out all processes.

Optionally, the setup data is received by the second trusted application without being processed by the first application.

Advantageously, this allows the sensitive data to be transmitted directly to the second trusted application, and subsequently processed and stored within the TEE, bypassing the first application in the relatively less secure REE. This increases the security of the present method whilst still enabling all necessary provisioning data to be provided to the mobile computing device before execution of any processes.

Optionally, the setup data comprises at least one of the plurality of data elements, and initializing the second trusted application further comprises storing the at least one of the plurality of data elements by the second trusted application within the second execution environment.

Optionally, the method further comprises determining which ones of the plurality of data elements are to be combined to generate the authentication code based on a set of instructions forming at least a part of the setup data.

Advantageously, the above-described method ensures that, during initialization and setup, some or all of the data elements used by the second trusted application to generate the authentication code for a particular process may be provided to and stored by the second trusted application, via a secure communication channel. When the process is executed and the second trusted application is called by the first application, the second trusted application is able to access all the necessary data, and has also been provided with the necessary instructions to determine which data elements should be combined to generate an authentication code unique to the type of process executed. This increases the security of the method, as it does not require any additional transmission of data or instructions from an external server during execution of the process. This is particularly important when executing a payment transaction process, where the security of the data is paramount, and there may not be a secure communication channel readily available at the time when the authentication code is required to be generated.

Optionally, the method further comprises processing the setup data by the second trusted application; and identifying (a) any sensitive data elements comprised within the setup data and (b) any data elements comprised within the setup data that relate only to the first application.

Optionally, the method further comprises retaining, by the second trusted application, the sensitive data elements within the second execution environment; and transmitting, from the second trusted application to the first application via the secure communications channel, the data elements relating only to the first application.

It may be advantageous for all of the setup data (even that intended for the first application) to be first transmitted to and processed by the second trusted application, which is located within the secure TEE. In the above-described method, the second trusted application is able to identify data elements that are particularly sensitive and should not leave the TEE, as well as any data elements that should be transmitted to the first application to complete its setup. The first application (in the relatively less secure REE) is therefore only provided with the data required to carry out its functions, and the sensitive data never leaves the secure environment. This segregation of data provisioning and storage allows the majority (if not all) of the processing and authentication to be carried out in situ by the mobile computing device implementing the above method, without necessitating any external authentication or transmission of sensitive data during execution of the process. The flexibility and security of the system is therefore increased.

Optionally, the first application is a mobile payment application and executing the first application corresponds to executing a payment transaction. The method may further comprise generating the one or more data items by generating at least one of: a unique representation of the payment transaction, and an authentication code for use in authenticating the payment transaction.

The above described methods are particularly advantageous when applied to payment transaction processes, which necessarily require flexibility and a high degree of security when generating authentication codes (e.g. cryptograms).

Optionally, the method comprises generating the authentication code by combining a plurality of data elements, and the plurality of data elements to be combined is dependent on the type of payment transaction to be executed.

Optionally, the method comprises storing, by the second trusted application, at least one of the plurality of data elements within the second execution environment.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment or claim can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGS

The disclosure will now be described in detail by way of example only, with reference to the drawings, in which.

Figure 2:
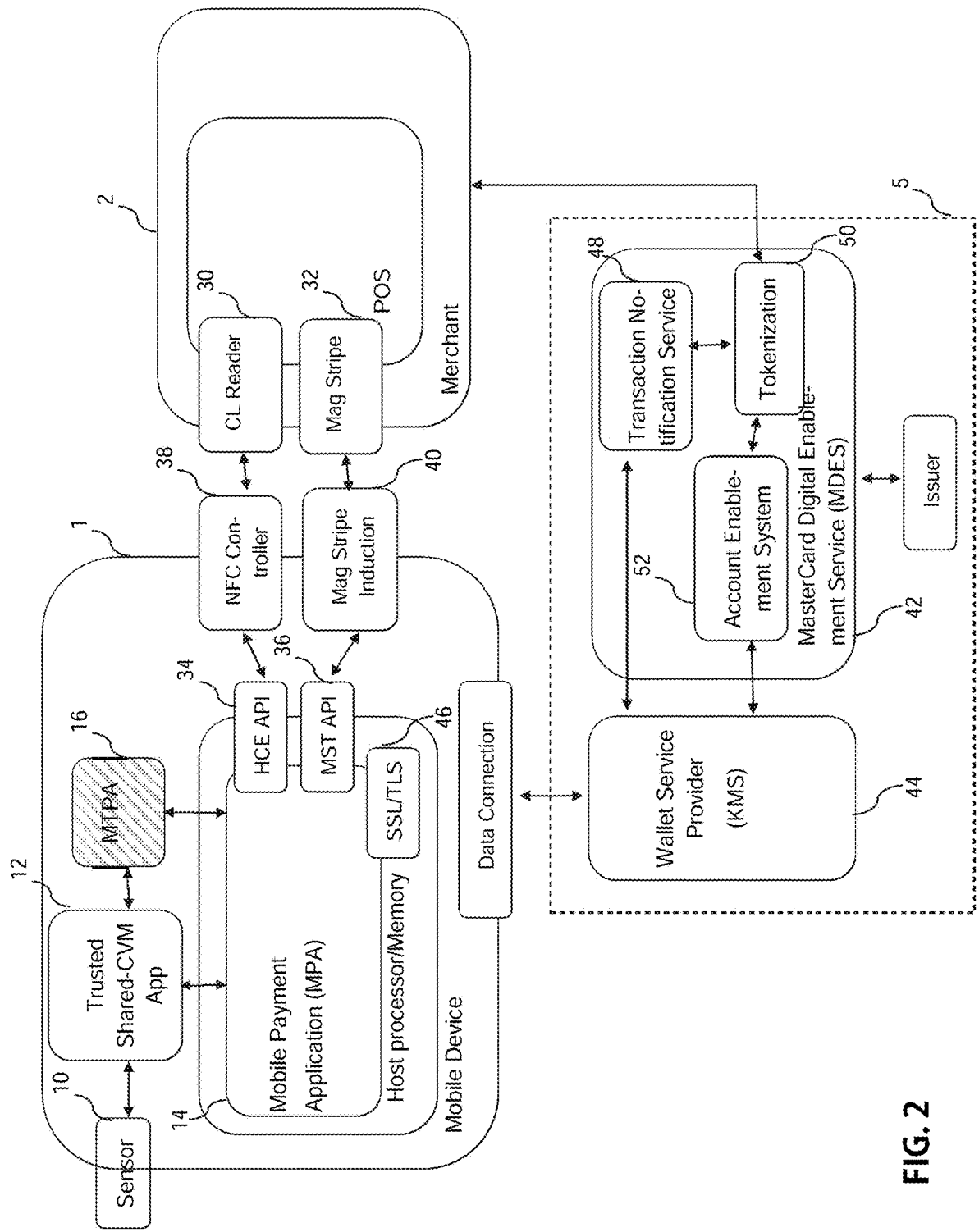
FIG. 2 shows a schematic block diagram providing further details of the mobile device, POI terminal and card issuing system according to the embodiment of FIG. 1.
Figure 4A:
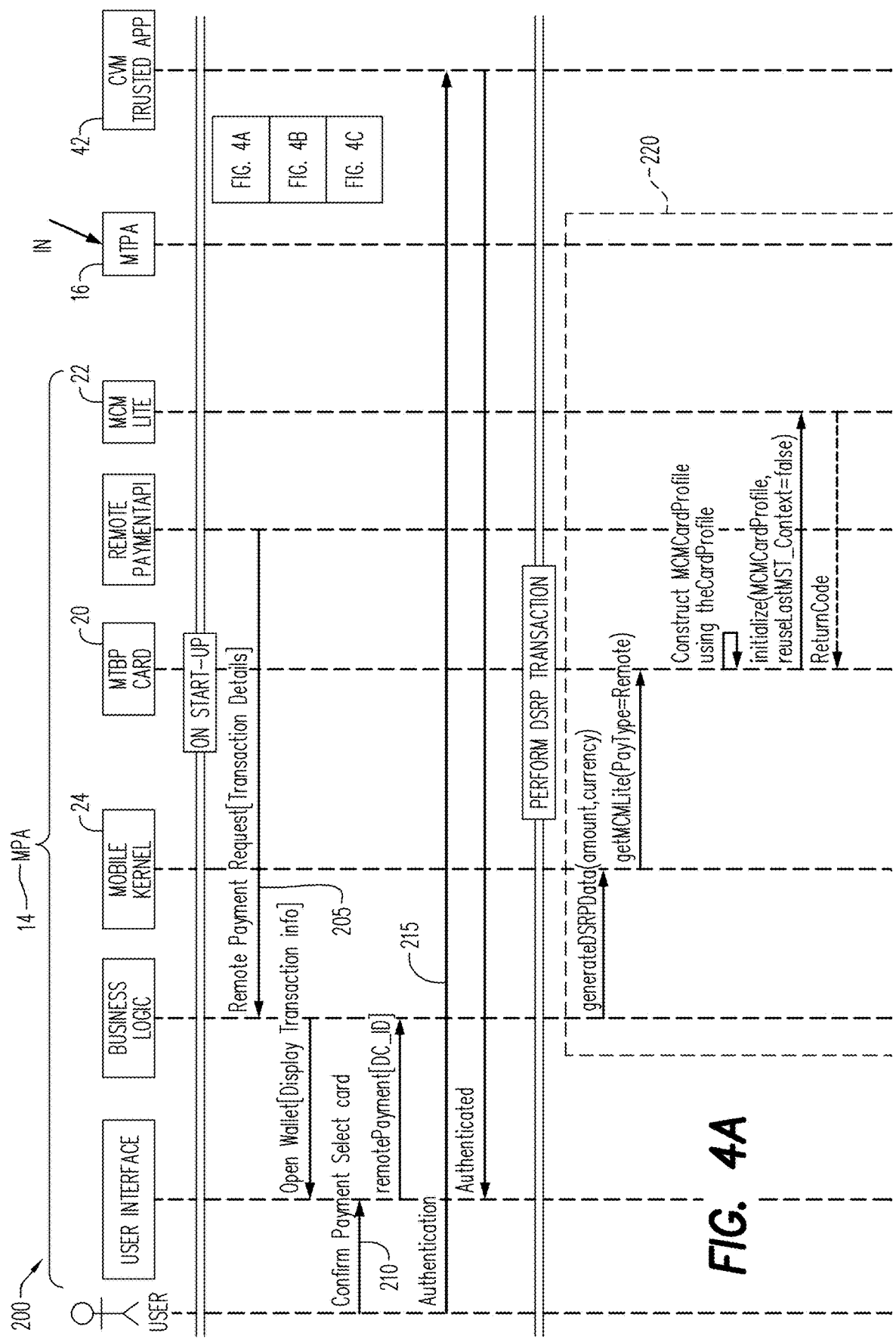
Figure 4B:
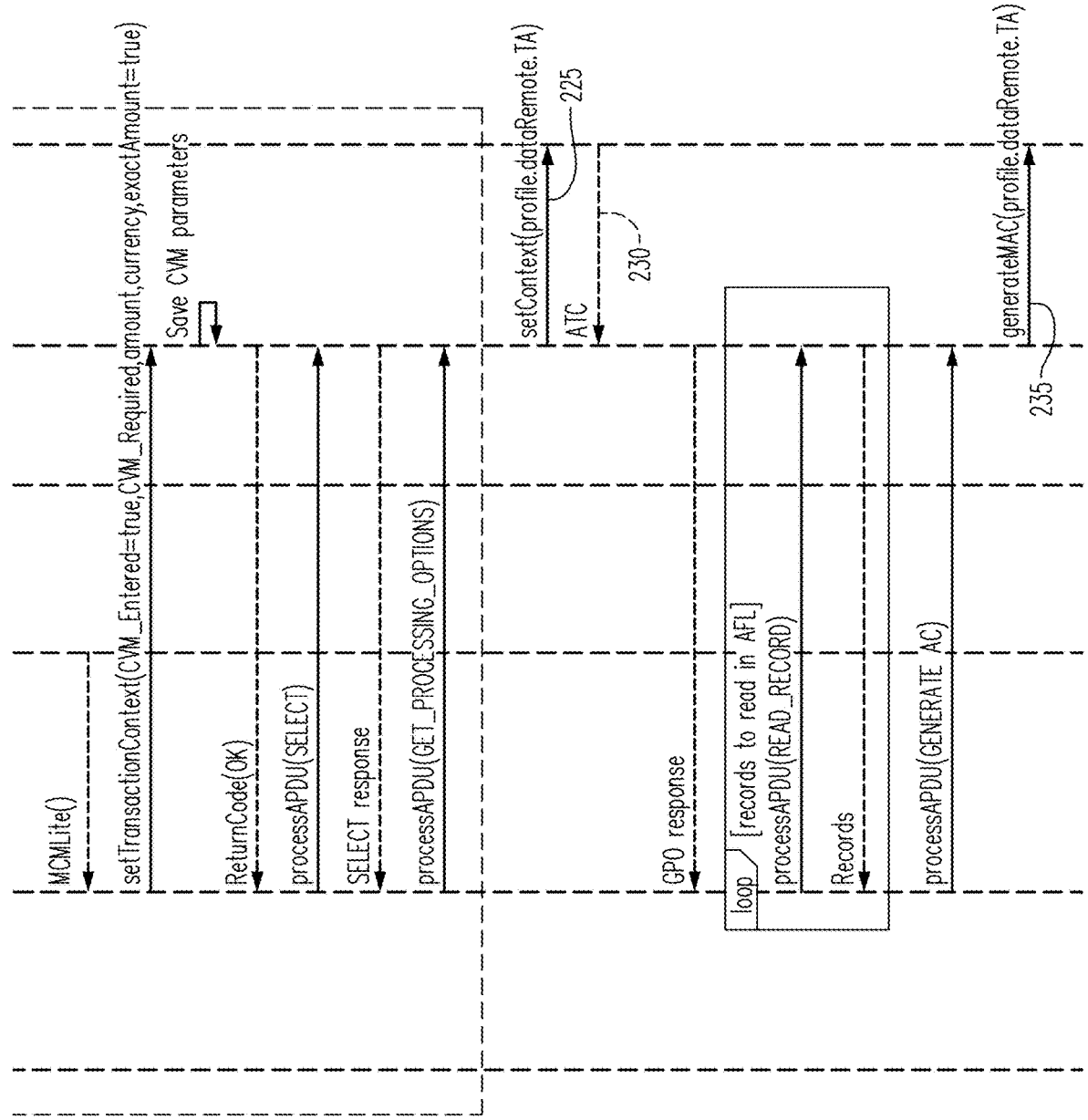
Figure 4C:
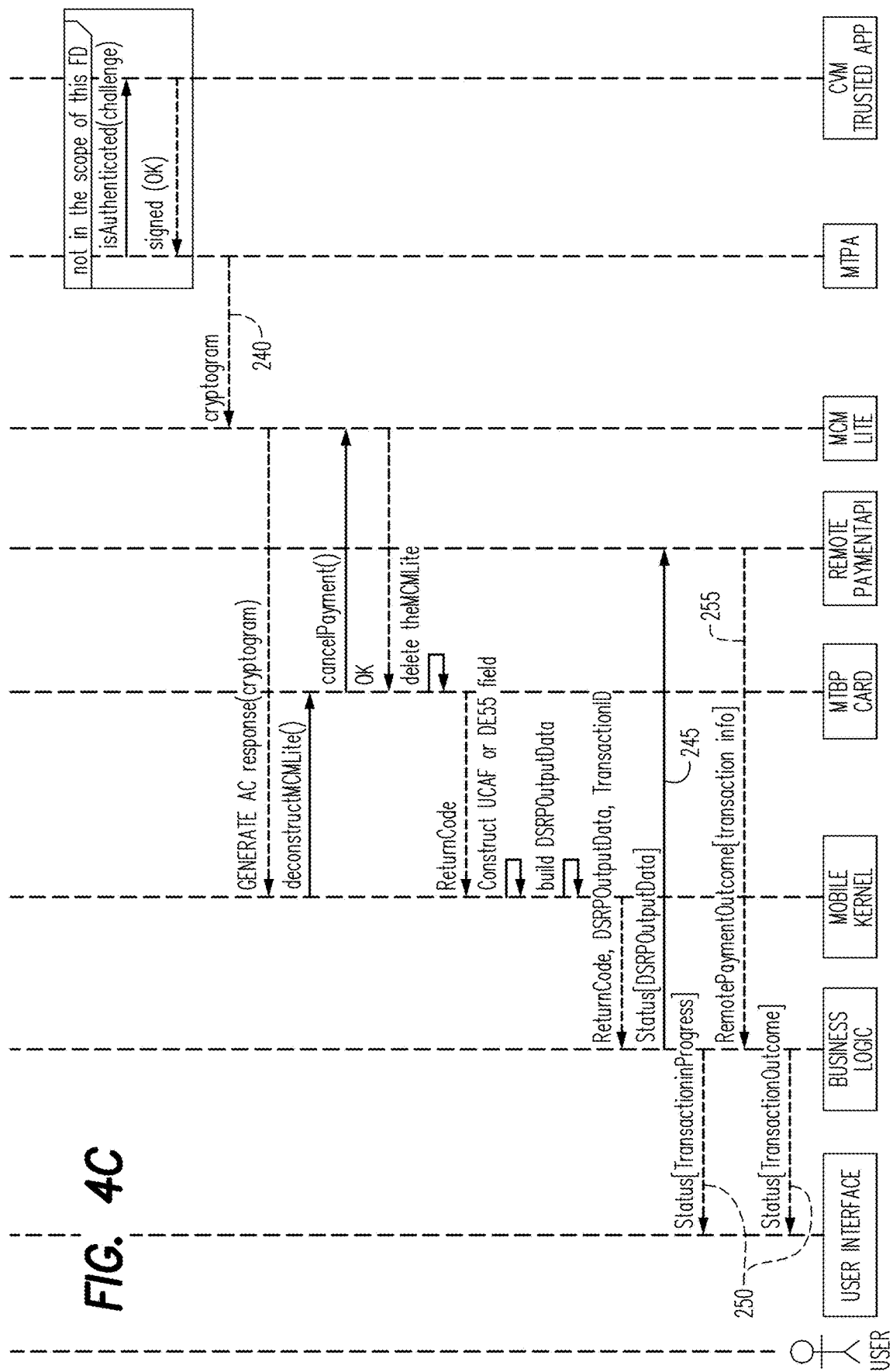
Figure 5A:
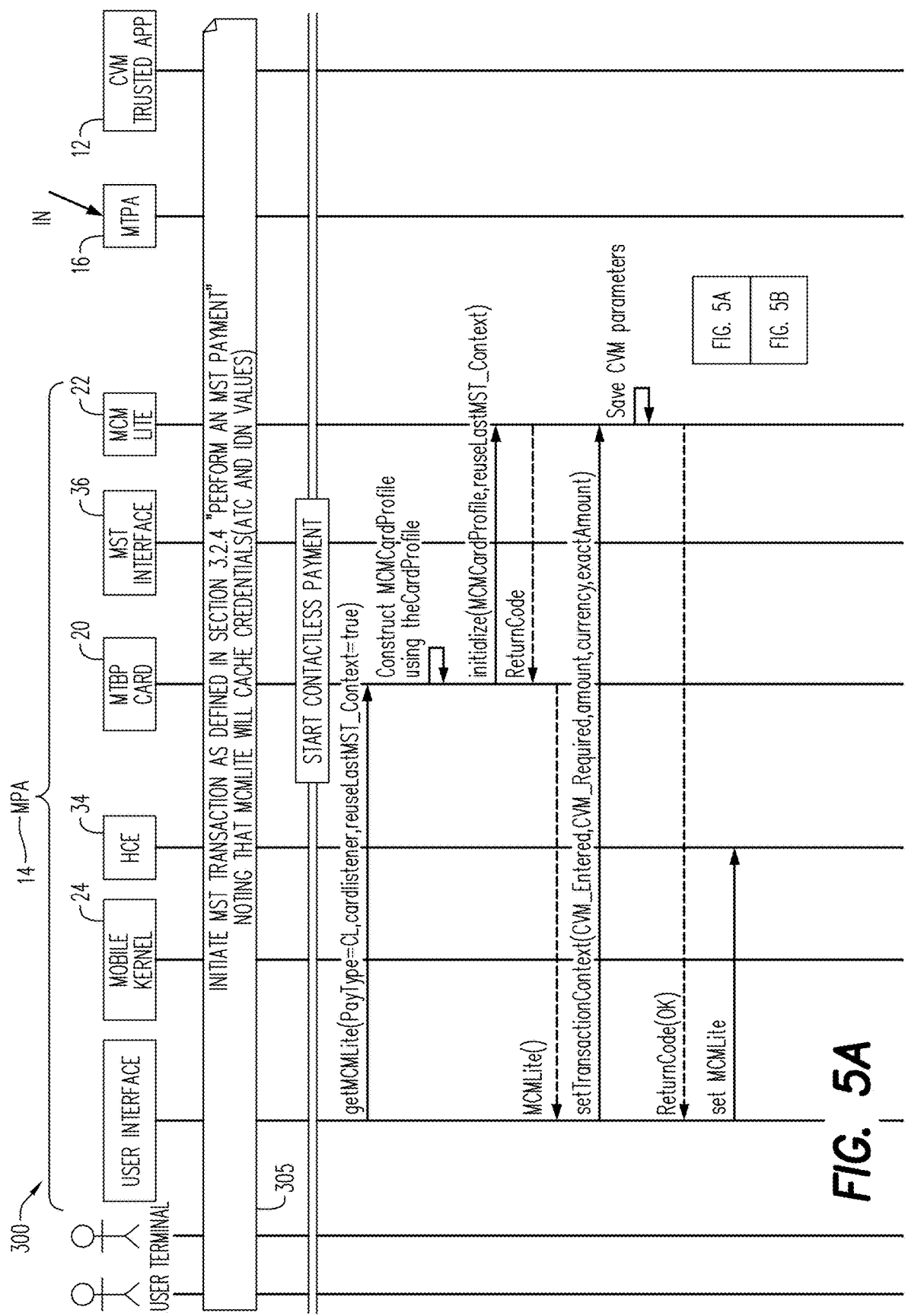
Figure 6:
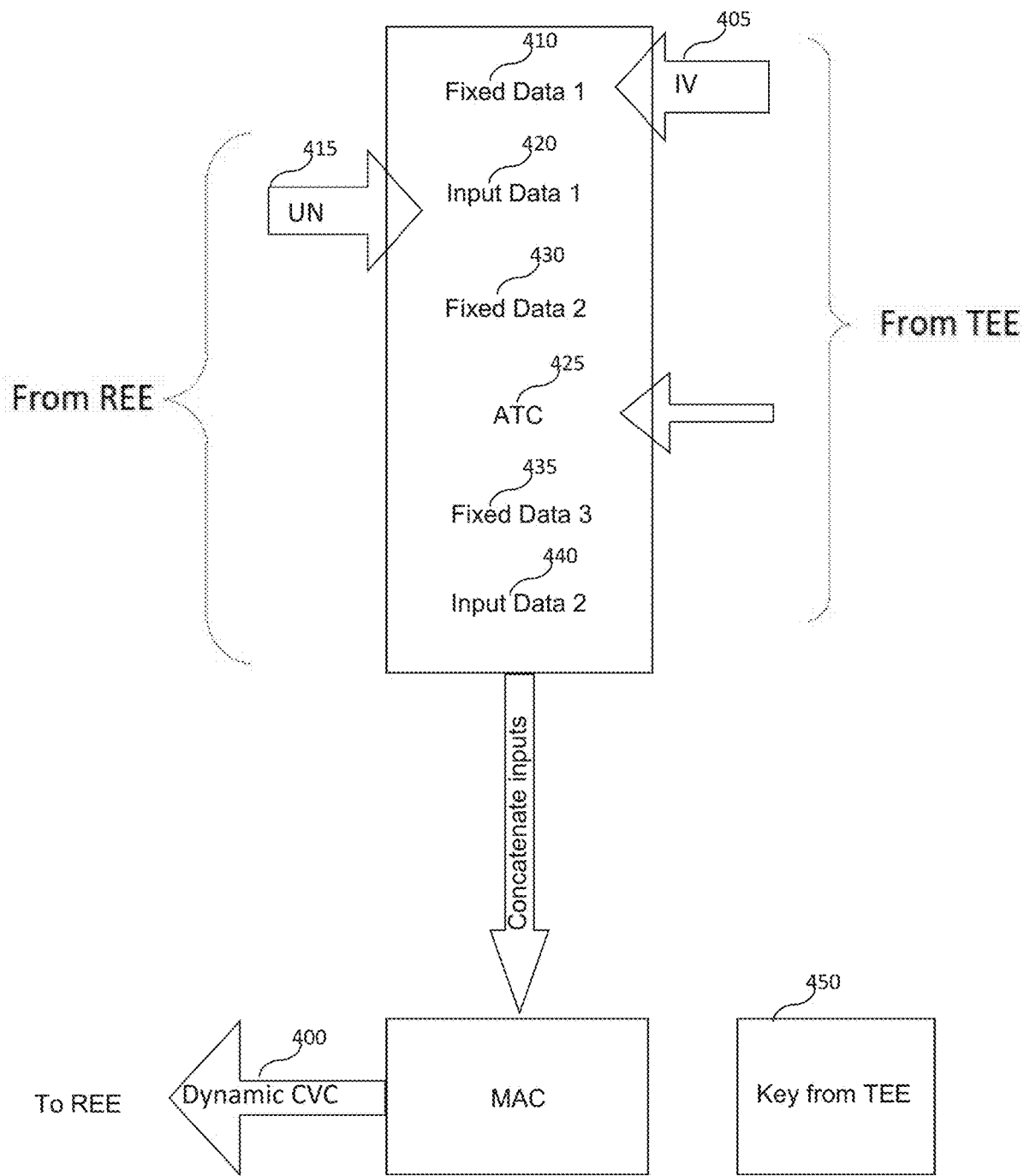
Figure 7:
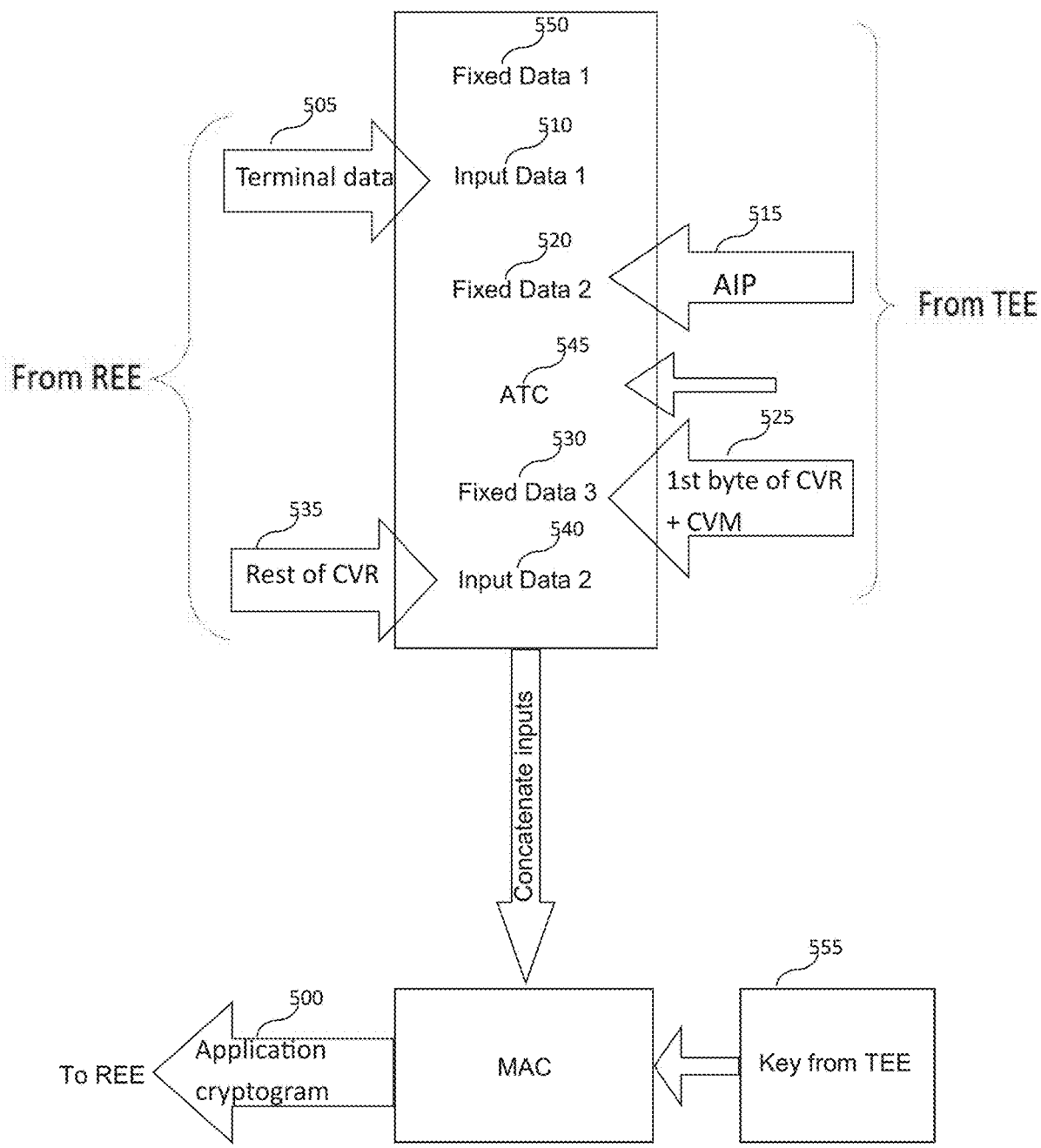

FIGS. 4A, 4B, and 4C are diagrammatic illustrations of a process of carrying out a remote payment transaction, according to the system embodiment of FIG. 2;

FIGS. 5A and 5B are diagrammatic illustrations of a process of carrying out a transaction using both magnetic stripe and contactless technology, according to the system embodiment of FIG. 2;

FIG. 6 is a schematic block diagram showing the generation of a cryptogram according to an embodiment of the present disclosure; and FIG. 7 is a schematic block diagram showing the generation of a cryptogram according to another embodiment of the present disclosure.

Where the figures laid out herein illustrate embodiments of the present disclosure, these should not be construed as limiting to the scope of the disclosure. Where appropriate, like reference numerals will be used in different figures to relate to the same structural features of the illustrated embodiments.

DETAILED DESCRIPTION

Figure 1:
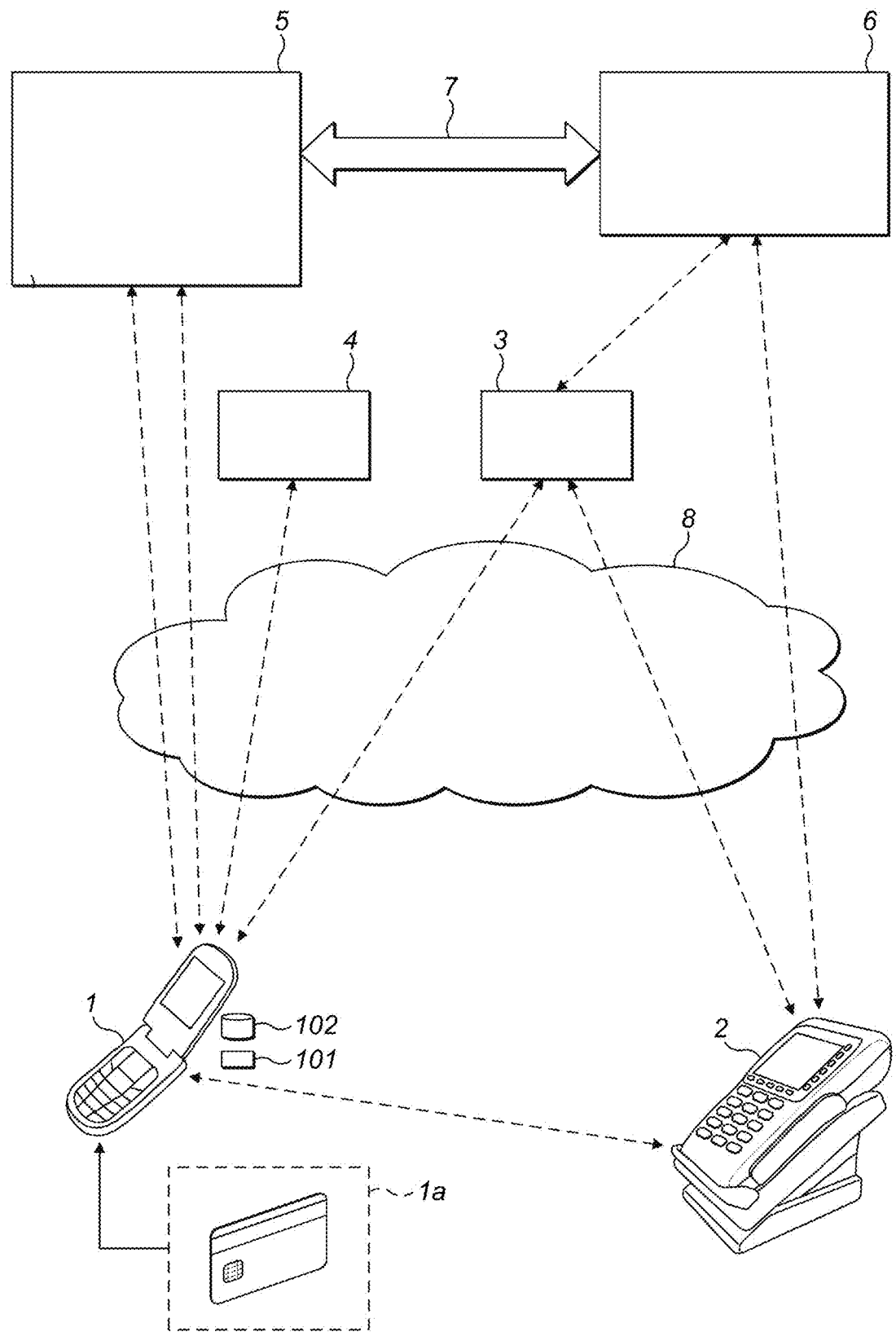
FIG. 1 shows an exemplary transaction system in which embodiments of the present disclosure may be used.

Specific embodiments are described below with reference to the figures. FIG. 1 shows an exemplary transaction system in which embodiments of the disclosure may be used.

A user (not shown) is provided with a payment device—this may be for example a mobile computing device, such as a mobile phone 1, acting as a proxy for a payment card 1a. The mobile device has at least one processor 101 and at least one memory 102 together providing at least one execution environment, as described further below. These devices have firmware and applications run in at least one Rich execution environment (REE) with an operating system such as iOS, Android or Windows. Payment devices will typically be equipped with means to communicate with other elements of a payment infrastructure. These communication means may comprise antennae and associated hardware and software to enable communication by NFC and associated contactless card protocols such as those defined under ISO/IEC 14443, or they may comprise an antenna and associated hardware and software to allow local wireless networking using 802.11 protocols or any combination of the above.

Other computer equipment in a conventional infrastructure is typically fixed, but in cases of interest point of interaction (POI) terminals 2 may also be mobile. The example shown is a mobile point-of-sale (MPOS) terminal 2 used by a merchant interacting with the user. This type of POI terminal may support NFC-enabled transactions and/or transactions that involve the use of magnetic stripe technology. Such equipment is typically connected or connectable to an acquiring bank 6 or other system in a secure way (either through a dedicated channel or through a secure communication mechanism over a public or insecure channel—here connection is shown as passing through the public internet 8). Alternatively, the payments may be mediated by a payment gateway 3 acting for a merchant—this may be an internet payment gateway acting for an online merchant, for example, thereby enabling remote payments to be carried out.

Another element shown in this system is an online authentication service 4, which provides online authentication. The role of the online authentication service is the subject of a different patent application (EP 15167761), and is described in greater detail in that document; it is not within the scope of the present disclosure and will not be considered further here.

There is also shown a mechanism to allow connection between the mobile device and a card issuing bank 5 or system. A banking infrastructure 7 will also connect the card issuer 5 and the acquiring bank 6, allowing transactions to be carried out between them.

FIG. 2 shows in more detail functional elements of the system of FIG. 1 which are suitable for implementing embodiments of the present disclosure, namely the mobile device 1, the POI terminal 2 and the card issuing system 5.

The mobile device 1 has at least one processor and at least one memory—these are not shown explicitly in FIG. 2, but between them they provide at least two execution environments.

A first execution environment (a Rich execution environment or REE) runs the main operating system and is the environment for regular applications running on the mobile handset. A second execution environment (a trusted execution environment or TEE) is logically isolated from the first execution environment—this does not mean that there is no interaction between the two execution environments, but rather that the channels for interaction between the two environments are constrained so that data can be held and code can run securely in the TEE without risk of leakage to or subversion by processes in the REE. The TEE may have its own trusted operating system adapted to maintain this logical isolation, and also contains one or more trusted applications adapted to run in this trusted execution environment. Those applications in this disclosure which run in the TEE are indicated by diagonal lines in FIG. 2.

The mobile device 1 comprises a biometric sensor 10 and an additional user interface (not shown) suitable for user interaction during the transaction process. The sensor 10 and user interface are connected to a Trusted Shared-CVM (Card Verification Method) Application 12 (henceforth referred to as the Trusted CVM App), the operation and programming of which is specific to the operating system of the mobile device 1 (e.g. IOS, Android etc.).

The main elements in the mobile device which are usually actively involved in the data processing associated with a payment transaction are a Mobile Payment Application (MPA) 14 which runs in the REE, and a MasterCard Trusted Payment Application (MTPA) 16 which runs in the TEE.

As will be discussed below, particularly effective implementation of and user interaction with a payment application may be achieved by separating the processing steps of a transaction between the applications in the REE and the TEE.

Specifically, according to embodiments of the present disclosure, the MPA 14 in the REE provides the mobile payment functionality and may comprise multiple sub-modules (not shown in FIG. 2 but indicated in FIGS. 3-5), which each carry out different tasks. The MPA 14 may comprise a sub-module (referred to subsequently in the figures as the MTBPCard 20) that is responsible for the management of the digitized card(s) and is programmed with the 'business logic' necessary to guide the steps of the transaction process. The MPA 14 may also comprise a sub-module (referred to subsequently in the figures as the MCMLite 22) to generate transaction data and provide a simplified implementation of a mobile SE application. The MPA 14 may further comprise a sub-module (referred to subsequently in the figures as the Mobile Kernel 24) containing the software library necessary to implement the transaction processing steps (e.g. emulate a POI terminal, build track data in case the MST interface is utilised, or to compute chip data in the case of a remote payment transaction).

According to embodiments of the present disclosure, the MTPA 16 in the TEE comprises a generic cryptographic-generation engine and provides cryptographic services to the MPA 14 to support the MPA's payment processing functionality. The MTPA 16 generates a Message Authentication Code (MAC) in the form of a cryptogram which is used to verify that a particular transaction has been successfully carried out and also to indicate whether CVM was performed successfully by the Trusted CVM App 12.

This separation of functionalities between the MPA 14 running in the REE and the MTPA 16 running in the TEE provides efficient and effective partitioning of tasks and data storage, without requiring a large amount of communication between the two environments. This ensures that sensitive information is retained securely within the TEE whilst the majority of the processing can be carried out by the MPA 14 in the REE.

In order to carry out a transaction, the mobile device must be in operative communication with a merchant POI terminal 2. The POI terminal 2 comprises a contactless (CL) reader 30 and a magnetic stripe reader 32, providing the functionality to enact contactless (NFC-enabled) transactions as well as magnetic stripe (MST) transactions. To enable communication with the POI terminal, the MPA 14 in the mobile device comprises an HCE API 34 and an MST API 36, which are connected to an NFC controller 38 and a magnetic stripe induction element 40 (located outside the MPA 14 but within the mobile device) respectively. The APIs allow the MPA 14 to communicate instructions to the NFC controller 38 and the MST element 40, and facilitate the transfer of transaction-related data between the POI terminal and the mobile device, depending on the type of transaction required.

Additionally or alternatively, the mobile device may carry out remote transactions over the internet using an online payment gateway (not shown) acting for the merchant. This is enabled by providing a remote payment API in the MPA 14 which is used to communicate instructions via, for example, the internet.

The card issuing system 5 comprises a MasterCard Digital Enablement Service (MDES 42), a digitization and tokenization platform that is in operative communication with the POI terminal via a payment network (not shown). The card issuing system also comprises a wallet service provider (henceforth referred to as a KMS (Key Management Service) Wallet 44) that is in operative communication with the mobile device and the MDES 42, and via which the MDES 42 communicates with and transmits data to the MPA 14 and the MTPA 16. Specifically, the KMS Wallet 44 communicates with the mobile device via an SSL/TLS interface which provides a secure channel of communication with the MPA 14 and MTPA 16.

The MDES 42 further comprises a transaction notification service module 48, a tokenization module 50 and an account enablement system 52, the latter of which carries out the personalization and provisioning of account credentials, cryptographic keys and associated data into the MPA 14 and MTPA 16.

In order to carry out their functions, both the MPA 14 and MTPA 16 must be personalized via provisioning data that is provided by the MDES 42 via the KMS Wallet 44. In particular, during setup, the MTPA 16 is provided with provisioning data relating to the digitized card. The data is processed in the secure environment of the MTPA 16 to determine which portions are sensitive and should be retained within the TEE, and which portions are necessary for the MPA 14 to carry out the transaction and hence must be provided to the REE. Later, during a transaction, the MPA 14 will communicate with the MTPA 16 initially to notify it of the type of transaction that is being carried out; subsequent communications will involve the MPA 14 requesting an authentication code (MAC) in the form of a cryptogram from the MTPA 16 which is used to verify the transaction success.

A more detailed description of the provisioning and personalization of the MTPA 16 and MPA 14, and different methods of generating a cryptogram (MAC), is provided later with reference to FIGS. 6 and 7.

Figure 3A:
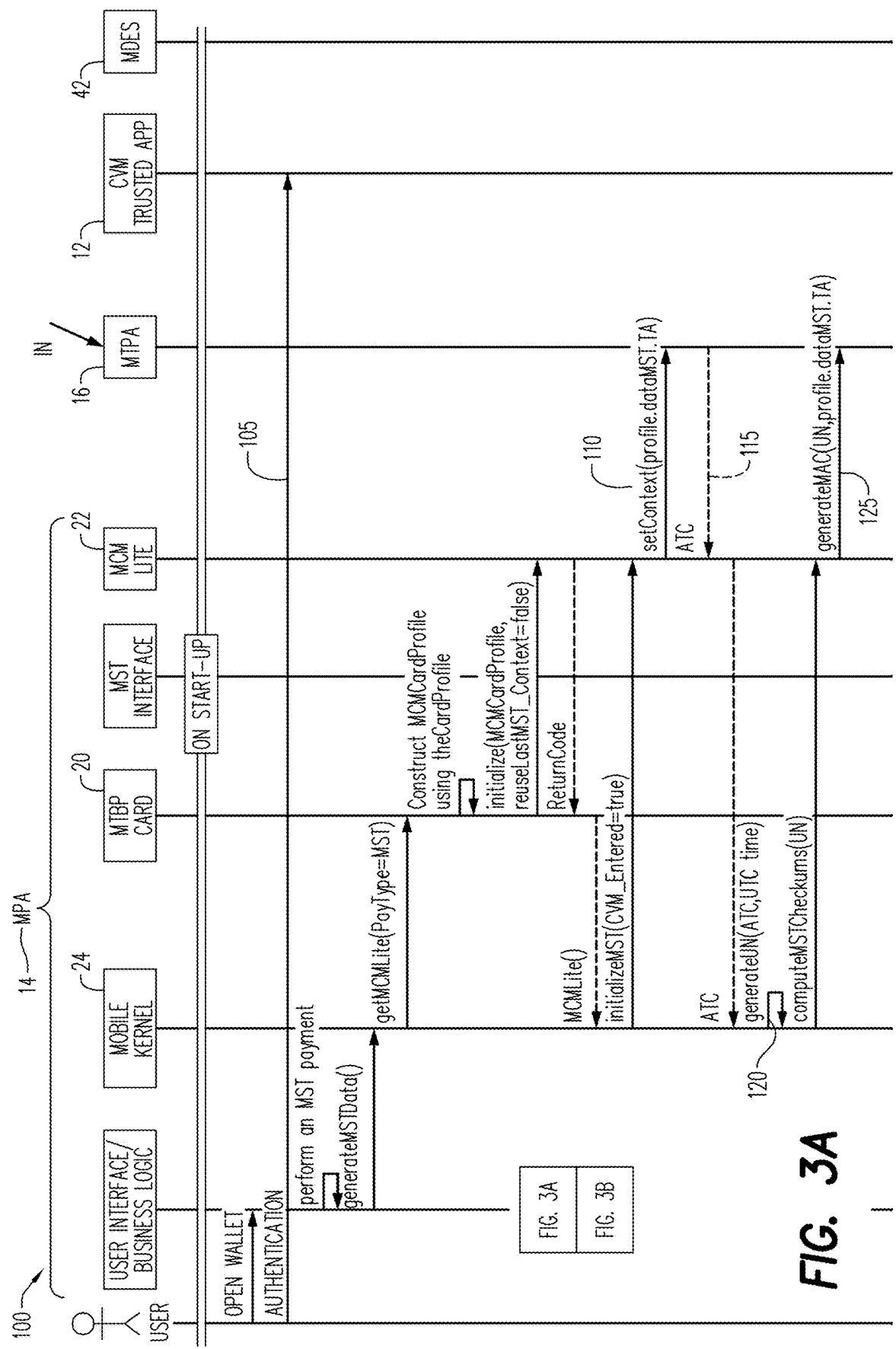
FIGS. 3A and 3B are diagrammatic illustrations of a process of carrying out a transaction using magnetic stripe induction technology (MST), according to the system embodiment of FIG. 2.
Figure 3B:
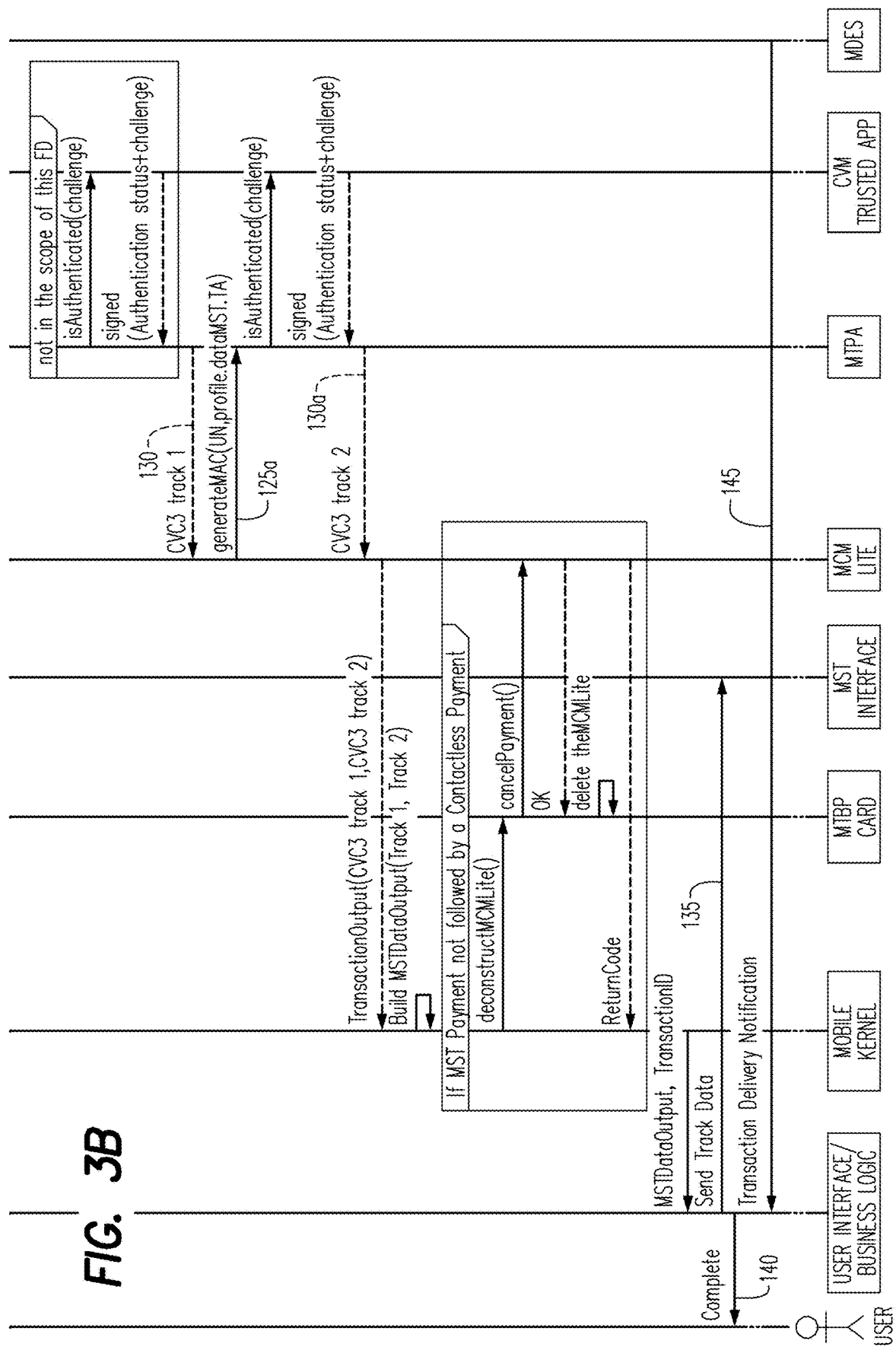

FIGS. 3A and 3B are diagrammatic illustrations of a process of carrying out an MST transaction using the system components of FIG. 2, including the MPA 14 (and its associated sub-modules), the MTPA 16, the MDES 42, and the Trusted CVM App 12.

As shown in the figure, the process 100 begins when the user initiates a transaction by opening the payment application on the mobile device. At Step 105, the user authenticates himself by providing biometric data to the sensor, and this data is subsequently passed to the Trusted CVM App 12 to be authenticated.

At the same time, the MPA 14 identifies that the user is attempting to initiate an MST transaction and begins to carry out the setup and initialization of its sub-modules so as to utilize the correct business logic and software algorithms to facilitate an MST transaction. Once the MPA 14 is correctly set up, it outputs data at Step 110 to the MTPA 16 to prompt setup of the MTPA 16 in 'MST-mode'. This data corresponds to the "setContext" command shown in the figure and instructs the MTPA 16 of the type of cryptogram that will subsequently be requested and the location of the data that will be required to generate the cryptogram. In response to this command, the MTPA 16 returns at Step 115 an ATC (Application Transaction Counter—a sequential counter that is incremented every time the application is executed to carry out a transaction and is therefore unique to a particular transaction. Upon receipt of the ATC, the MPA 14 generates at Step 120 an Unpredictable Number (UN) based on the ATC and the time window during which the transaction was initiated.

The MPA 14 next outputs at Steps 125, 125a one or more commands to the MTPA 16 to generate a cryptogram to verify the transaction; these correspond to the "generateMAC" commands shown in the figure. Upon receipt of each generateMAC command, the MTPA 16 generates and returns at Steps 130, 130a a cryptogram (or MAC) to the MPA 14. The generation of the cryptogram may require the use of one or more cryptographic keys, which are provided to and retained by the MTPA 16 within the TEE. It is therefore preferable for the cryptogram or MAC to be generated by the MTPA 16 within the TEE, however, it should be noted that it is also possible for the MTPA 16 to return to the MPA 14 the cryptographic key(s) necessary for the generation of the cryptogram by the MPA 14. The data used to generate the MAC varies depending on the type of transaction, and the method and data inputs used to generate a MAC for an MST transaction is described later with reference to FIG. 6.

In order to complete the transaction with the POI terminal, the MPA 14 generates and provides at Step 135 track data to the POI terminal (including the MAC that was generated by the MTPA 16). When the merchant wishes to demonstrate the authenticity of the transaction to the card issuer, it is the MAC that is provided for verification purposes. The MAC provided to the MPA 14 therefore functions as a 'cryptographic signature' across the UN, details of the time window during which the transaction was carried out and (optionally) the transaction amount for that particular transaction, and allows for subsequent verification of the transaction by the card issuing system (by authenticating the uniqueness of the transaction and how up-to-date the transaction information is).

Once all the transaction data has been exchanged and processed, the user is informed at Step 140 (via the mobile device user interface) that the transaction has been carried out and that they may exit the payment application. Separately, the MDES 42 returns at Step 145 a notification to the MPA 14 indicating successful processing.

It should be noted that although function calls (e.g. setContext, generateMAC commands) from the MPA 14 to the MTPA 16 are described above as being sent separately to the MTPA 16, it would also be possible for multiple commands to be sent simultaneously in a single invocation of the MTPA 16 by the MPA 14. The MTPA 16 would then process the commands in the order in which they were made. In the case of an error associated with one of the commands, subsequent commands in the same invocation would not be processed.

FIGS. 4A, 4B, and 4C are diagrammatic illustrations of a process of carrying out a DSRP (Digital Secure Remote Payment) such as an internet-based payment, utilizing key system components of FIG. 2. Once again, these include the MPA 14, the MTPA 16 and the Trusted CVM App 12.

The transaction process 200 begins when the user attempts to complete a remote transaction and a request to allow this transaction is transmitted at Step 205 to the MPA 14 from the payment gateway. This request prompts the MPA 14 to open a virtual wallet and request that the user confirms the transaction details.

At Step 210, the user confirms the payment details and selects a digitized card to use, initiating the processing of a DSRP transaction by the MPA 14; the user also authenticates himself at Step 215 in a similar manner to that described above with reference to FIGS. 3A and 3B. The Trusted CVM App 12 confirms that the user has been successfully authenticated and the processing of a DSRP by the MPA 14/MTPA 16 is begun.

Sub-modules of the MPA 14 exchange at Step 220 multiple APDUs (Application Protocol Data Units) so as to read data from the digitized card and carry out the necessary processing steps for the transaction. In particular, DSRP data necessary to carry out a remote transaction is generated (or retrieved) and is provided to the remote payment processing gateway via a remote API interface.

In a similar manner to that described previously in respect of an MST transaction, the MPA 14 sends at Step 225 a setContext command to the MTPA 16 to initialize setup of the MTPA 16, although this time in 'DSRP-mode'; an ATC is returned at Step 23—to the MPA 14 by the MTPA 16 in response to this command. Subsequently, the MPA 14 requests at Step 235*a* cryptogram from the MTPA 16 (via a generateMAC command) which will be used to verify the transaction at a later time. The method and data inputs used to generate the cryptogram at Step 240 for a DSRP transaction is described in greater detail with reference to FIG. 7.

The MPA 14 subsequently completes the final stages of processing and provides at Step 245 the necessary DSRP transaction data (including the cryptogram) to the payment gateway via the remote payment API. Once this has been done, the MPA 14 notifies the user st Step 250 of the status of the transaction (via the user interface), and also provides updates at Step 250*a* upon receiving confirmation at Step 255 from the remote payment API regarding the success/failure of the transaction, so that the user remains informed of the transaction progress at all times.

The cryptogram that is returned to the MPA 14 at Step 240 serves substantially the same purpose as that returned in the MST transaction, as it allows the card issuer to verify and confirm the legitimacy of the transaction in online authorization and clearing carried out by the merchant.

FIGS. 5A and 5B are diagrammatic illustrations of a process of carrying out an MST transaction chained with an NFC transaction, using key components of the system of FIG. 2. As with the previously-described processes, the key system components utilized are the MPA 14, the MTPA 16 and the Trusted CVM App 12. Additionally, the MPA 14 specifically makes use of the HCE API and MST interface in this process.

The process 300 of FIGS. 5A and 5B involves a user initially requesting that an MST transaction be carried out but subsequently completing the transaction using NFC technology, as a result of the proximity of the mobile device to an NFC-enabled POI terminal. The MST interface of the mobile device therefore begins by broadcasting a signal to the POI terminal, however when the possibility of carrying out an NFC transaction becomes available, the MST interface is prevented from broadcasting any further data and the HCE API and NFC controller complete the transaction.

This process begins in a similar manner to that described in the case of the straightforward MST transaction described in FIGS. 3A and 3B. All the previously-described steps (labelled 305) beginning from the user initiating an MST transaction by opening the payment application on the mobile phone, up to and including the point where the MST interface of the mobile device begins to broadcast data to the magnetic stripe interface of the POI terminal, are performed substantially as described earlier with reference to FIGS. 3A and 3B with one main difference. In this instance, the ATC that is received by the MPA 14 from the MTPA 16 is cached by the MPA 14 for later use during the NFC-enabled transaction.

Whilst the mobile device's MST interface is broadcasting data to the POI terminal, if the mobile device is brought close enough to the POI terminal so as to allow the exchange of an NFC signal between the mobile device and the POI terminal, the process illustrated in FIGS. 5A and 5B are initiated, and the MPA 14 subsequently begins to configure itself to carry out a contactless payment. This configuring step requires that messages be exchanged between sub-modules of the MPA 14 to ensure that the correct business logic and software algorithms are implemented to carry out an NFC-enabled transaction. Once the MPA 14 has been set up correctly to perform an NFC-enabled transaction, the MPA 14 sends a command at Step 310 via the HCE API to the mobile device MST interface to effectively shut the interface down and prevent it from broadcasting any further data to the POI terminal.

Once the necessary processing has been completed within the MPA 14 enabling it to carry out a contactless transaction, the next step in the process would usually be for the MPA 14 to send a command to the MTPA 16 to request a further ATC for that contactless transaction. However, in this case, instead of doing so, the MPA 14 reuses at Step 320 the cached ATC that was obtained previously from the MTPA 16 in respect of the aborted MST transaction. The remaining steps required to complete an NFC-enabled transaction will not be described further here, except to state that subsequently, when the MPA 14 requests a cryptogram from the MTPA 16 using a generateMAC command, it is the cached ATC that is provided to the MTPA 16 for use in generating the cryptogram.

This re-use of a previous ATC ensures that in the unlikely event of transaction records for both the aborted MST transaction and the successful contactless transaction being submitted separately to the transaction processing system of the card issuer, it is possible to identify that the two records relate to the same transaction. This helps to prevent instances of fraud.

We now turn to a more detailed description of the functionality of the MTPA 16.

In general, the MTPA 16 is a highly flexible cryptographic-generation engine that can be personalized so as to generate payment cryptograms (MACs) that are tailored to a particular transaction type.

The functionality of the MTPA 16 is achieved by carrying out a pre-determined provisioning and personalization process during setup (prior to any transactions taking place). Specifically, personalization data (in the form of DGIs or Data Grouping Identifiers) is generated by the account enablement system in the MDES 42; this data is then provided to the MPA 14 (and thereby to the MTPA 16) via the KMS Wallet and the SSL/TLS interface. The personalization data contains the following key pieces of information which are retained at the MTPA 16:

- A set of keys, indexed at 1 . . . k (corresponding to DGI C401)
- A set of ATCs, indexed at 1 . . . n (corresponding to DGI C402)
- A set of 'fixed data values', indexed at 1 . . . a (corresponding to DGI C403)
- A set of profiles, indexed at 1 . . . p (corresponding to DGI C404)

DGI C401 identifies which keys the MTPA 16 needs to decipher/decrypt and retain within the MTPA 16, and contains a list of references to keys which (when located) are to be stored securely in the MTPA 16. Therefore, prior to this DGI being received and correctly processed by the MTPA 16, no personalization data is returned from the MTPA 16 to the MPA 14. After C401 has been received and processed, all DGIs which are specifically listed in C401 are deciphered but their content is retained in the MTPA 16 and only an indication that the DGI has been correctly processed is returned to the MPA 14 by the MTPA 16. All data which are not listed in C401 are considered safe (i.e. do not contain sensitive information) to return to the MPA 14.

Other DGIs, which are intended for use by the MPA 14, are also passed to the MTPA 16 first; as they are not specifically listed in DGI C401, they are validated and deciphered by the MTPA 16 and their contents are returned to the MPA 14.

One of the DGIs returned to the MPA 14 from the MTPA 16 defines the profiles that are used by the MPA 14 when invoking the MTPA 16. Multiple profiles may be used in the generation of a single MAC, as each profile relates to a particular operation (e.g. the location and value of the ATC that is to be generated by the MTPA 16) that needs to be carried out by the MTPA 16.

Each ATC in DGI C402 comprises a counter and a limit, wherein the counter is initialized to '0000' (or to another value provided by this or another DGI) and the typical limit relates to the maximum number of transactions (e.g. 20,000 or 65535). The ATC counter is incremented every time that the MTPA 16 is invoked using a setContext command from the MPA 14, and this DGI is used The fixed data values contained in DGI C403 are elements of hardcoded data that are included in the MAC calculations if required. Different portions (or bytes) of a particular fixed data value correspond to separate pieces of information which are used to generate a MAC for a specific transaction type. The nature of the fixed data values to be used in each MAC generation is indicated to the MTPA 16 in the profiles.

Each profile in DGI C404 comprises a compilation of personalized data. For example, each profile may relate to a specific operation or portion of a method used to generate a MAC for a particular transaction type. A profile therefore contains information regarding what rules to follow when generating a MAC; for example, whether to use an ATC, and what type of key and/or which fixed data values are to be used.

The process of generating a MAC begins when the MTPA 16 is initially invoked by the MPA 14 using the setContext command—this command transfers a profile identifier to the MTPA 16, instructing the MTPA 16 how to configure itself to receive and enact subsequent commands according to that identified profile.

Subsequent invocations of the MTPA 16 by the MPA 14 involve the transmission of one or more generateMAC commands which provide information allowing the MTPA 16 to generate a specific type of MAC.

FIGS. 6 and 7 are schematic block diagrams showing how a combination of data inputs from the REE and the TEE is used by the MTPA 16 to generate a MAC for provision to the MPA 14, according to embodiments of the present disclosure. Specifically, FIG. 6 shows an embodiment in which a MAC corresponding to a dynamic CVC is generated in relation to an MST transaction, while FIG. 7 shows an embodiment in which a MAC corresponding to an Application Cryptogram for a DSRP transaction is generated.

It should be noted that in each figure, all possible input data types that could be obtained from the REE and the TEE are shown; however only those data types which are associated with an arrow are actually used in the generation of the cryptogram for that particular transaction type.

The data that may be used to generate a cryptogram comprises a mixture of data from the MPA 14, as well as certain fixed data values and an ATC provided by the MTPA 16. The profile identifier defines which of these data are required for a particular cryptogram and the constraints on their sizes. Specifically in this example, a maximum of three fixed data values (as well as an ATC value) may be provided by the MTPA 16, while a maximum of two input data values may be provided by the MPA 14. All relevant input data elements are concatenated (and enciphered). In some embodiments, these concatenated data inputs are combined with a key that is stored in the TEE by the MTPA 16, or is diversified from such a key. By constructing a profile that defines what data to include in each supported case, a very flexible cryptographic engine can be constructed that permits it to be applied to a wide number of use cases from the MPA 14 whilst retaining control of critical values (such as indication of successful CVM, the ATC and the AIP) within the TEE.

Referring to FIG. 6, where the MTPA 16 receives a generateMAC command from the MPA 14 specifying that the profile(s) to be used correspond to those required for an MST transaction, the MTPA 16 requires the following inputs to generate a dynamic CVC 400:

An Initial Vector 405 (IV) is provided as Fixed Data 1 410—this is an arbitrary number that can be used along with a secret key for data encryption An Unpredictable Number 415 (UN) is provided as Input Data 1 420

An ATC 425 (originally provided to the MPA 14 in response to a setContext command)

It can be seen that Fixed Data 2 and 3 430, 435, and Input Data 2 440 are not populated in this case; furthermore, no session key 450 is utilized. Input Data 1 420 is derived from the MPA 14 operating within the REE, whereas Fixed Data 1 410 and the ATC 425 are derived from the MTPA 16 operating within the TEE.

The above data inputs are concatenated together (and enciphered) to generate a dynamic CVC 400. This is then returned to the MPA 14 by the MTPA 16 and is subsequently forwarded to the POI terminal 2 during the transaction to allow verification of the transaction at a later date.

Referring to FIG. 7, where the MTPA 16 receives a generateMAC command from the MPA 14 specifying that the profile(s) to be used correspond to those required for a DSRP transaction, the MTPA 16 requires the following inputs to generate a cryptogram 500:

Data 505 sourced from a remote terminal and which has been input by the user is provided as Input Data 1 510

The AIP 515 (Application Interchange Profile) is provided as Fixed Data 2 520—this provides the list of functions to be performed when processing the transaction data A portion (specifically the first byte) of the Card Verification Results (CVR) containing the cryptogram type and the CVM results (as obtained from the Trusted CVM App 12) 525 are provided as Fixed Data 3 530

The remainder of the CVR 535 is provided as Input Data 2 540

An ATC 545 (originally provided to the MPA 14 in response to a setContext command)

It can be seen from here that Fixed Data 1 550 is not populated in this case. Input Data 1 and Input Data 2 510, 540 are derived from the MPA 14 operating within the REE, whereas Fixed Data 2 520, Fixed Data 3 530 and the ATC 545 are derived from the MTPA 16 operating within the TEE. The above data inputs are concatenated (and enciphered) and, together with a session key 555 derived from a master key held by the MTPA 16 in the TEE, are used to generate an application cryptogram 500. This resultant application cryptogram 500 is then transmitted to the MPA 14 and subsequently provided to the card issuing system 5 where it is used as a means of verification of the transaction by the card issuer.

It may be seen that the above-described embodiments of the present disclosure provide for a highly flexible, simple and secure means for carrying out mobile payment transactions by utilizing the capabilities of a TEE and an REE within a user's mobile device. In the present disclosure, it is not necessary for any external system elements to be required in the main transaction processing steps.

By ensuring that the most sensitive information is retained securely within the TEE (and is never released to the MPA 14 in the REE), whilst allowing the majority of the payment processing to be carried out within the mobile device, the present disclosure thereby allows personalization of elements of the mobile device to support multiple different payment processes, whilst permitting the processing in the TEE to be restricted to the minimum functionality required.

As the person skilled in the art will appreciate, modifications and variations to the above embodiments may be provided, and further embodiments may be developed, without departing from the spirit and scope of the disclosure.

The invention claimed is:

1. A mobile computing device having a first execution environment and a second execution environment, the mobile device comprising: a processor; and
a memory storing program instructions which when executed by the processor cause the processor to perform a method comprising:
initiating, within the first execution environment, a payment application;
initiating, within the second execution environment, a trusted application, the trusted application logically constrained to prevent modification from the first execution environment and the second execution environment storing a plurality of fixed data values;
receiving, by the trusted application, a request to generate an authentication code from the payment application, wherein the request includes a profile identifier;
receiving, by the trusted application, a plurality of input values from the payment application that is located in the first execution environment;
determining, by the trusted application and based on the profile identifier, a transaction type from among a plurality of transaction types including at least a magnetic stripe transaction type, an interact transaction type, and a near-field communication transaction type;
selecting, by the trusted application and based on the determined transaction type, one or more input values of the plurality of input values and one or more fixed data values of the plurality of fixed data values;
dynamically generating, by the trusted application, the authentication code using the selected one or more input values and the selected one or more fixed data values;
transferring the generated authentication code from the trusted application to the payment application via a secure communications channel; and
transmitting the authentication code from the mobile computing device, via the payment application, to a payment system.

2. The mobile computing device of claim 1, wherein the trusted application is configured to receive configuration data from the payment application via the secure communications channel, and the configuration data comprises instructions for generating the authentication code.

3. The mobile computing device of claim 1, wherein the authentication code is configured for use in authenticating a payment process executed by the payment application in the first execution environment.

4. The mobile computing device of claim 1, wherein at least one of the plurality of input values are received by the trusted application from the payment application via the secure communications channel.

5. The mobile computing device of claim 1, wherein at least one of the plurality of fixed data values are stored by the trusted application within the second execution environment.

6. The mobile computing device of claim 1, wherein the payment application is a mobile payment application configured to execute a payment transaction.

7. The mobile computing device of claim 1, wherein the transferring further comprises transferring a unique representation of the payment transaction from the trusted application to the payment application for use in authenticating a payment transaction.

8. The mobile computing device of claim 1, further comprising a biometric sensor for use in authenticating, a user of the mobile computing device.

9. A method comprising:
generating, by a processor of a mobile computing device, a first execution environment and a second execution environment logically constrained to prevent modification from the first execution environment within a mobile computing device;
initiating, within the first execution environment, a payment application:
initiating, within the second execution environment, a trusted application, the trusted application logically constrained to prevent modification from the first execution environment and the second execution environment storing a plurality of fixed values;
receiving, by the trusted application, a request to generate an authentication code from the payment application, wherein the request includes a profile identifier:
receiving, by the trusted application, a plurality of input values from the payment application that is located in the first execution environment:
determining, by the trusted application and based on the profile identifier, a transaction type from among a plurality of transaction types including at least a magnetic stripe transaction type, an internet transaction type, and a near-field communication transaction type;
selecting, by the trusted application and based on the determined transaction type, one or more input values of the plurality of input values and one or more fixed values of the plurality of fixed values;
dynamically generating, by the trusted application, the authentication code using the selected one or more input values and the selected one or more fixed values;
transferring the generated authentication code from the trusted application to the payment application via a secure communications channel; and
transmitting the authentication code from the mobile computing device, via the payment application, to a payment system.

10. The method of claim 9, further comprising receiving, at the trusted application, configuration data from the payment application via the secure communications channel, wherein the configuration data comprises instructions for generating the authentication code.

11. The method of claim 9, further comprising authenticating a payment process executed by the payment application in the first execution environment based on the authentication code.

12. The method of claim 1, wherein the authenticated code is generated based on one or more cryptographic keys which are stored by the trusted application in the second execution environment and which are logically isolated from the payment application in the first execution environment.

13. The method of claim 1, wherein the generating comprises running the trusted application in a different operating system than the payment application.

* * * * *